(12) United States Patent
Honda et al.

(10) Patent No.: US 11,872,663 B2
(45) Date of Patent: Jan. 16, 2024

(54) REPAIR WELDING METHOD

(71) Applicant: MITSUBISHI POWER, LTD., Yokohama (JP)

(72) Inventors: Masaki Honda, Tokyo (JP); Toshiaki Nishio, Tokyo (JP); Nobuyoshi Komai, Tokyo (JP); Takumi Tokiyoshi, Tokyo (JP); Masaaki Fujita, Yokohama (JP); Kimihiko Tominaga, Yokohama (JP); Hiroyuki Ohyama, Yokohama (JP); Fumitoshi Sakata, Yokohama (JP); Koichi Teshima, Yokohama (JP); Eiji Murakami, Yokohama (JP); Akinori Yamaguchi, Yokohama (JP); Fumio Nishi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 301 days.

(21) Appl. No.: 17/258,240

(22) PCT Filed: Jul. 19, 2019

(86) PCT No.: PCT/JP2019/028529
§ 371 (c)(1),
(2) Date: Jan. 6, 2021

(87) PCT Pub. No.: WO2020/017649
PCT Pub. Date: Jan. 23, 2020

(65) Prior Publication Data
US 2021/0268612 A1 Sep. 2, 2021

(30) Foreign Application Priority Data
Jul. 20, 2018 (JP) .................................. 2018-136325

(51) Int. Cl.
*B23K 31/00* (2006.01)
*B23P 6/04* (2006.01)
(Continued)

(52) U.S. Cl.
CPC .............. *B23P 6/04* (2013.01); *B23K 31/027* (2013.01); *B23K 31/12* (2013.01);
(Continued)

(58) Field of Classification Search
CPC . B23P 6/04; B23P 6/00; B23K 31/027; B23K 31/12; B23K 2101/06;
(Continued)

(56) References Cited

U.S. PATENT DOCUMENTS 4,234,119 A * 11/1980 Masaoka .............. B23K 9/0216
219/137 R
5,258,600 A * 11/1993 Arthur ................... B23K 31/02
219/76.12
(Continued)

FOREIGN PATENT DOCUMENTS

AU 2008355101 A1 * 7/2010 ............. B23K 20/08
CA 2536051 C * 7/2009 ......... B23K 35/3086
(Continued)

OTHER PUBLICATIONS

Machine translation of JP-2015116603A (no date available).*
(Continued)

*Primary Examiner* — Kiley S Stoner
(74) *Attorney, Agent, or Firm* — WHDA, LLP

(57) ABSTRACT

A repair welding method according to at least one embodiment is for a member in which a first end and a second end of a parent material are connected by welding and includes: a step of removing a portion including at least a part of a first heat-affected zone of an existing welded portion of the member; and a step of performing repair welding after
(Continued)

removing the portion. In a cross-section including the parent material and the existing welded portion, all intersection portions between the first heat-affected zone of the existing welded portion and a second heat-affected zone due to the repair welding have an intersection angle between the first heat-affected zone and the second heat-affected zone of 70° to 110°.

7 Claims, 11 Drawing Sheets

(51) Int. Cl.
    *B23K 31/02*     (2006.01)
    *B23K 31/12*     (2006.01)
    *F16L 55/16*     (2006.01)
    *B23K 103/04*     (2006.01)
    *B23K 101/06*     (2006.01)

(52) U.S. Cl.
    CPC ...... *F16L 55/1608* (2013.01); *B23K 2101/06* (2018.08); *B23K 2103/04* (2018.08)

(58) Field of Classification Search
    CPC .. B23K 2103/04; B23K 31/125; B23K 31/02; F16L 55/1608; F16L 9/17; F16L 55/1683
    USPC .................................................. 228/104, 119
    See application file for complete search history.

(56) References Cited

U.S. PATENT DOCUMENTS

| | | | | |
|---|---|---|---|---|
| 6,302,314 | B1* | 10/2001 | Horio | G01N 29/11 |
| | | | | 228/103 |
| 6,336,583 | B1 | 1/2002 | Wang et al. | |
| 2005/0015980 | A1* | 1/2005 | Kottilingam | B23K 10/027 |
| | | | | 29/888.011 |
| 2008/0230584 | A1* | 9/2008 | Lederich | B23K 20/1225 |
| | | | | 228/112.1 |
| 2009/0068495 | A1* | 3/2009 | Dembowski | B23K 31/02 |
| | | | | 219/60 R |
| 2018/0031152 | A1* | 2/2018 | Rajagopalan | B23K 9/0282 |
| 2018/0292357 | A1* | 10/2018 | Leach | G01N 29/262 |
| 2019/0226048 | A1* | 7/2019 | Kimura | B23K 31/00 |

FOREIGN PATENT DOCUMENTS

| | | | | | |
|---|---|---|---|---|---|
| CN | 103801835 | A | * | 5/2014 | ......... B23K 2103/50 |
| CN | 104759743 | A | * | 7/2015 | ............ B32K 35/304 |
| CN | 106077951 | A | * | 11/2016 | ............. B23K 26/04 |
| CN | 106232279 | A | * | 12/2016 | ........... B23K 33/004 |
| CN | 106624612 | A | * | 5/2017 | |
| CN | 107142427 | A | * | 9/2017 | ............. B21C 37/06 |
| CN | 108098180 | A | * | 6/2018 | ........... B23K 31/125 |
| CN | 108796364 | A | * | 11/2018 | ............. B21C 37/08 |
| CN | 111906414 | A | * | 11/2020 | ............... B23K 9/02 |
| CN | 112846460 | A | * | 5/2021 | ............ B23K 9/167 |
| CN | 113070548 | A | * | 7/2021 | |
| EP | 1122018 | A2 | * | 8/2001 | .......... B23K 26/122 |
| EP | 1927668 | A2 | * | 6/2008 | .......... B23K 9/0253 |
| JP | 60-008148 | B2 | | 3/1985 | |
| JP | 2003053533 | A | * | 2/2003 | ......... B23K 26/123 |
| JP | 2003253337 | A | * | 9/2003 | ................ B23P 6/00 |
| JP | 4461031 | B2 | | 5/2010 | |
| JP | 2011-194458 | A | | 10/2011 | |
| JP | 2014-147949 | A | | 8/2014 | |
| JP | 2015-116603 | A | | 6/2015 | |
| WO | WO-2010071146 | A1 | * | 6/2010 | ............. B32K 31/12 |
| WO | WO-2012103628 | A1 | * | 8/2012 | ........... B23K 31/125 |

OTHER PUBLICATIONS

International Search Report dated Oct. 15, 2019, issued in counterpart application No. PCT/JP2019/028529 (2 pages).
Machine translation of JP 2015-116603 A dated Jun. 25, 2015. (6 pages).
Machine translation of JP 2011-194458 A dated Oct. 6, 2011. (5 pages).
Office Action dated Oct. 18, 2023, issued in counterpart DE application No. 11 2019 003 015.9. (7 pages).

\* cited by examiner

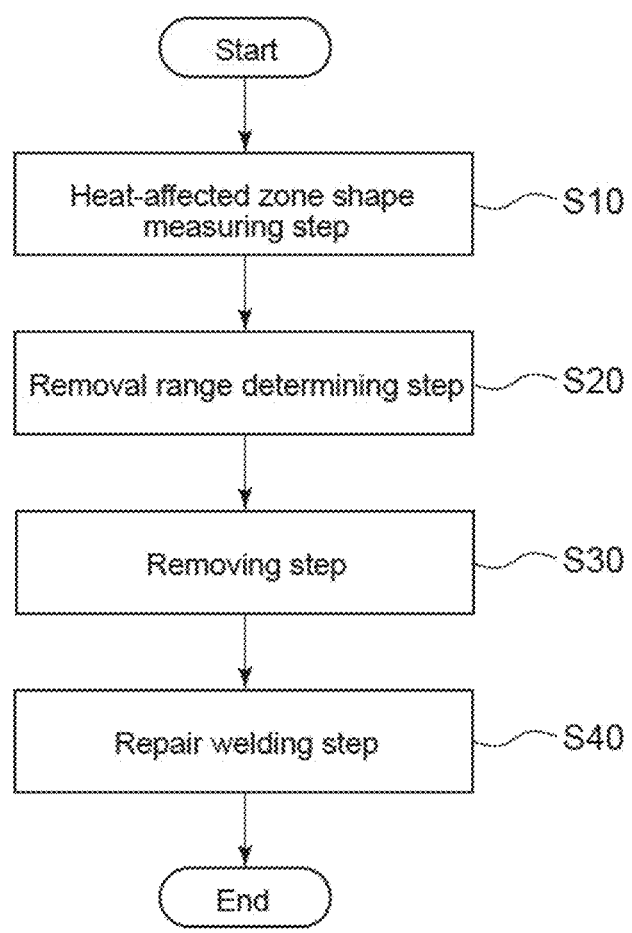

REPAIR WELDING METHOD

TECHNICAL FIELD

The present disclosure relates to a repair welding method.

BACKGROUND

After a member having a welded portion is used, repair welding may be performed for repair.

For example, in high-temperature pipes of boilers and turbines in thermal power and nuclear power plants, chemical plants, etc., creep damage may occur in the welded portion due to long-term use.

In such a case, instead of replacing the entire pipe in which the creep damage has occurred, the portion where the creep damage has occurred is excised, and the excised portion is subjected to repair welding (see Patent Document 1).

CITATION LIST

Patent Literature

Patent Document 1: JPS60-008148B

SUMMARY

Problems to be Solved

In the repair welding method disclosed in Patent Document 1, stress acting on the heat-affected zone is reduced by considering the extending direction of the heat-affected zone generated by repair welding inside the main welded joint deposited metal, that is, the weld metal of the existing welded portion.

A region where the heat-affected zone of the existing welded portion and the heat-affected zone due to the repair welding overlap is affected by both heat when the existing welded portion has been obtained and when the repair welding is performed, so that this region is likely to be damaged due to the acting stress, compared with a region affected by either one of heat when the existing weld has been obtained or heat when the repair welding is performed. Therefore, it is desired to reduce the region where the heat-affected zone of the existing welded portion and the heat-affected zone due to the repair welding overlap as much as possible. However, the repair welding method disclosed in Patent Document 1 does not mention the region where the heat-affected zone of the existing welded portion and the heat-affected zone due to the repair welding overlap.

In view of the above, an object of at least one embodiment of the present invention is to suppress the influence of the heat-affected zone due to repair welding on the lifetime of the member.

Solution to the Problems (1) A repair welding method according to at least one embodiment of the present invention is a method for a member in which a first end and a second end of a parent material are connected by welding, comprising: a step of removing a portion including at least a part of a first heat-affected zone of an existing welded portion of the member; and a step of performing repair welding after removing the portion. In a cross-section including the parent material and the existing welded portion, all intersection portions between the first heat-affected zone of the existing welded portion and a second heat-affected zone due to the repair welding have an intersection angle between the first heat-affected zone and the second heat-affected zone of 70° to 110°.

In a cross-section including the parent material and the existing welded portion, the intersection portion between the first heat-affected zone of the existing welded portion and the second heat-affected zone due to the repair welding is likely to be damaged by the acting stress as described above, so that it is desired to reduce the intersection portion as much as possible. In a cross-section including the parent material and the existing welded portion, since the first heat-affected zone and the second heat-affected zone are formed with constant widths along the interfaces with the respective weld metals, when the intersection angles between the first heat-affected zone and the second heat-affected zone are 90°, the cross-sectional area of the intersection portion can be minimized, and as the intersection angles are deviated from 90°, the cross-sectional area of the intersection portion increases.

In this regard, with the above method (1), since the intersection angles between the first heat-affected zone and the second heat-affected zone range from 70° to 110°, in a cross-section including the parent material and the existing welded portion, it is possible to suppress the increase in cross-sectional area of the intersection portion. As a result, it is possible to suppress the reduction in lifetime of the member due to the repair welding.

(2) In some embodiments, in the above method (1), in a cross-section including the parent material and the existing welded portion, the repair welding is performed from the parent material on a first end side to the parent material on a second end side, and a second distance is 1.1 to 2.0 times a first distance, where the first distance is a distance on a surface of the parent material between the first heat-affected zone formed in the parent material on the first end side and the first heat-affected zone formed in the parent material on the second end side before removing the portion including at least a part of the first heat-affected zone, and the second distance is a distance on a surface of the parent material between the second heat-affected zone formed in the parent material on the first end side and the second heat-affected zone formed in the parent material on the second end side.

With the above method (2), since the second distance is 1.1 times or more the first distance, it is possible to suppress the overlapping of the first heat-affected zone and the second heat-affected zone in the vicinity of the surface of the parent material. Further, with the above method (2), since the second distance is 2.0 times or less the first distance, it is possible to suppress the range of the repair welding.

(3) In some embodiments, in the above method (1) or (2), in a cross-section including the parent material and the existing welded portion, the repair welding is performed from the parent material on a first end side to the parent material on a second end side, and a third distance is not greater than a fourth distance, where the third distance is a distance between the intersection portion on the first end side and the intersection portion on the second end side, and the fourth distance is a distance between positions of the second heat-affected zone on the first end side and the second end side at a depth 0.8 times a maximum value of a depth from a surface of a weld metal of the repair welding to the second heat-affected zone.

With the above method (3), the depths of the intersection portion on the first end side and the intersection portion on the second end side, i.e., the depth of the weld metal of the repair welding from the surface can be set to 0.8 times or more the maximum value of the depth from the surface of the weld metal of the repair welding to the second heat-affected zone. Thus, in a cross-section including the parent material and the existing welded portion, the positions in the depth direction of the intersection portion on the first end side and the intersection portion on the second end side can be brought closer to the deepest position in the second heat-affected zone. Accordingly, the extending directions of the intersection portion on the first end side and the intersection portion on the second end side can be brought closer to a direction perpendicular to the depth direction. Therefore, when the first heat-affected zone in the intersection portion extends in substantially the same direction as the depth direction, the intersection angle at the intersection portion can be brought closer to 90°, so that it is possible to suppress the increase in cross-sectional area of the intersection portion.

(4) In some embodiments, in any one of the above methods (1) to (3), in a cross-section including the parent material and the existing welded portion, an intersection angle between an extending direction of the second heat-affected zone formed in a weld metal of the existing welded portion due to the repair welding and a thickness direction of the member is 70° to 110°.

The second heat-affected zone formed in the weld metal of the existing welded portion due to the repair welding, i.e., the second heat-affected zone at the weld metal of the existing welded portion is more likely to be damaged due to the acting stress, than the weld metal of the existing welded portion not affected by heat of the repair welding or the second heat-affected zone of the parent material. Accordingly, if tensile stress acts on the member in a direction in which the first end and the second end are away from each other, it is desired that the projection area of the second heat-affected zone at the weld metal of the existing welded portion when viewed from the acting direction of the tensile stress is as small as possible.

In this regard, with the above method (4), in a cross-section including the parent material and the existing welded portion, since the intersection angle between the extending direction of the second heat-affected zone at the weld metal of the existing welded portion and the thickness direction of the member is 70° to 110°, the extending direction of the second heat-affected zone at the weld metal of the existing welded portion is close to the direction in which the tensile stress acts, so that it is possible to reduce the projection area.

(5) In some embodiments, in any one of the above methods (1) to (4), a weld toe of the repair welding is at the parent material.

With the above method (5), compared with the case where the weld toe of the repair welding is at the weld metal of the existing welded portion, it is possible to reduce a region of the second heat-affected zone at the weld metal.

(6) In some embodiments, in the above method (1), in a cross-section including the parent material and the existing welded portion, the repair welding is performed from the parent material on a first end side to a weld metal of the existing welded portion, and an intermediate position between a position of the second heat-affected zone appearing on a surface of the parent material on the first end side and a position of the second heat-affected zone appearing on a surface of the weld metal of the existing welded portion is at the weld metal of the existing welded portion before removing the portion including at least a part of the first heat-affected zone.

With the above method (6), while suppressing the increase in cross-sectional area of the intersection portion, the removal amount in the step of removing the portion including at least a part of the first heat-affected zone and the volume of the weld metal by the repair welding can be reduced, and the production cost for the repair welding can be reduced.

(7) In some embodiments, any one of the above methods (1) to (6) further comprises: a step of measuring a shape of the first heat-affected zone prior to the step of performing the repair welding; and a step of determining a removal range to be removed in the step of removing the portion including at least a part of the first heat-affected zone, based on the shape of the first heat-affected zone measured in the step of measuring the shape of the first heat-affected zone.

With the above method (7), the portion including at least a part of the first heat-affected zone can be removed such that the intersection angle between the first heat-affected zone and the second heat-affected zone is 70° to 110°. As a result, it is possible to suppress the increase in cross-sectional area of the intersection portion in a cross-section including the parent material and the existing welded portion, and it is possible to suppress the reduction in lifetime of the member due to the repair welding.

(8) In some embodiments, in the above method (7), the step of measuring the shape of the first heat-affected zone includes measuring the shape of the first heat-affected zone by ultrasonic flaw detection with a phased array method, or measuring the shape of the first heat-affected zone by developing the shape of the first heat-affected zone by etching.

With the above method (8), by measuring the shape of the first heat-affected zone by ultrasonic flaw detection with the phased array method, the shape of the first heat-affected zone can be measured non-destructively. Further, with the above method (8), by making the shape of the first heat-affected zone appear on the surface of the member by a simple method of etching, the shape of the first heat-affected zone can be easily measured.

(9) In some embodiments, in any one of the above methods (1) to (8), the parent material is high-strength ferritic heat-resistant steel.

The method (9) is suitable for repair welding of a member in which the parent material is made of high-strength ferritic heat-resistant steel.

(10) In some embodiments, in any one of the above methods (1) to (9), the member is a boiler tube.

The method (10) is suitable for repair welding of a boiler tube.

Advantageous Effects

According to at least one embodiment of the present invention, it is possible to suppress the influence of the heat-affected zone of due to repair welding on the lifetime of the member.

BRIEF DESCRIPTION OF DRAWINGS

FIG. 3 is a flowchart showing the process of the repair welding method according to some embodiments.

FIG. 4A is a diagram Showing the macro-structure of the cross-section, and FIG. 4B is a contour diagram showing a result of ultrasonic flaw detection by the phased array method on the cross-section.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
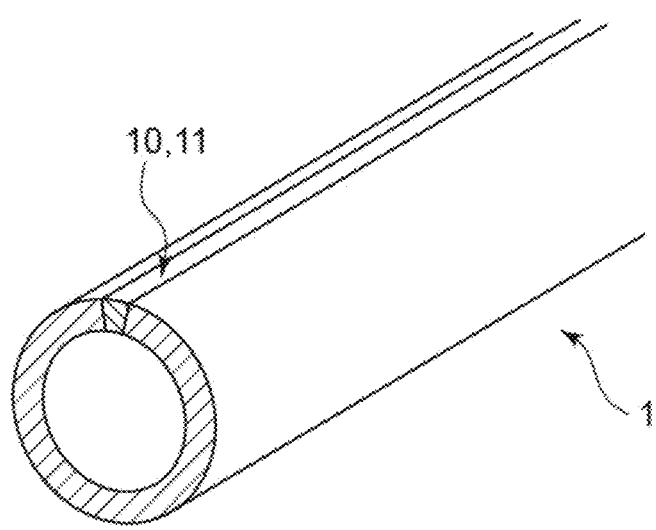
FIG. 1 is a diagram showing a part of a pipe as an example of a member to which the repair welding method according to some embodiments is applied.

FIG. 1 is a diagram showing a part of a pipe as an example of a member to which the repair welding method according to some embodiments is applied.

The member (target) to which the repair welding method according to some embodiments is applied is, for example, high-temperature pipes of boilers and turbines in thermal power and nuclear power plants, chemical plants, etc. Such a high-temperature pipe (pipe) 1 has multiple types of welds. For example, the high-temperature pipe has a circumferential weld that connects pipes and a header tube weld that connects header and branch pipes. Further, in the case where the pipe 1 is produced from plate members, as shown in FIG. 1, the pipe has a longitudinal weld 10 extending in the pipe axis direction for connecting ends of the plates which are the parent material.

Figure 2:
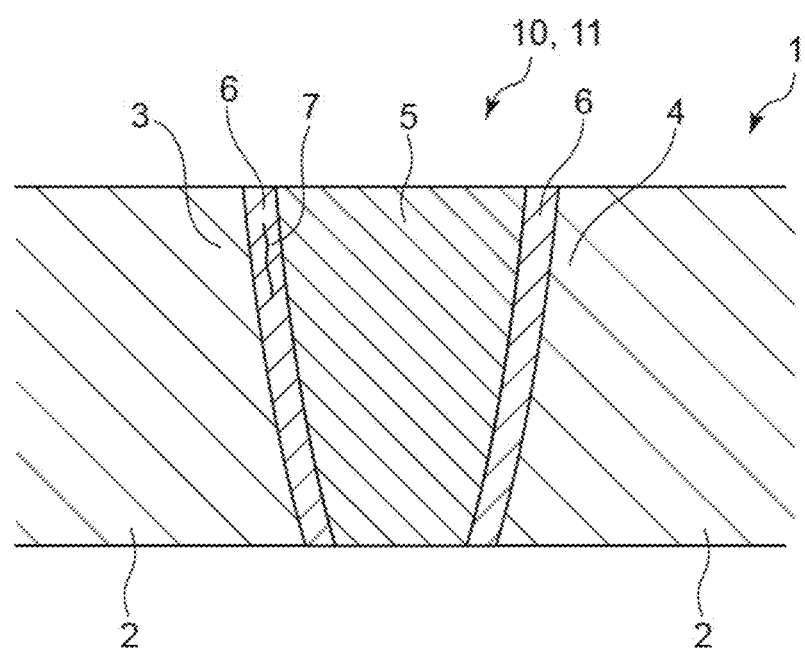
FIG. 2 is a diagram schematically showing a part of a cross-section of the pipe including a parent material and an existing welded portion.

A material used for a long time in a high-temperature and high-pressure environment, such as the high-temperature pipe 1, may get a crack due to creep damage at a welded portion, particular, at a heat-affected zone (HAZ). In the following, an example where the crack occurs in the heat-affected zone of the longitudinal weld 10 of the pipe 1 will be described. FIG. 2 is a diagram schematically showing a part of a cross-section of the pipe 1 including a parent material 2 and an existing welded portion 11. In other words, FIG. 2 is a diagram schematically showing a part of a cross-section of the pipe 1 taken perpendicular to the pipe axis direction (cross-section viewed from the pipe axis direction). In FIG. 2 the right-left direction is the circumferential direction of the pipe 1, the upper side is the radially outer side, and the lower side is the radially inner side. In the following, the longitudinal weld 10 existing before repair welding is referred to as an existing welded portion 11.

The existing welded portion 11 is a welded portion connecting a first end 3 and a second end 4 of the parent material 2 of the pipe 1, and includes a weld metal 5, and a heat-affected zone 6 generated in the parent material 2 by the influence of heat during welding of the existing welded portion 11. In the pipe 1 shown in FIG. 2, a crack 7 occurs in the heat-affected zone 6 at a side of the first end 3. Hoop stress acts mainly on the pipe 1 due to the pressure of a fluid flowing inside the pipe 1. Accordingly, tensile stress mainly acts on the existing welded portion 11 in the circumferential direction, that is, in the right-left direction in FIG. 2.

For instance, in some embodiments, the pipe 1 is inspected at periodic inspections of the plant. In the following, a case where the crack 7 in the pipe 1 is found by periodic inspections, and the pipe 1 is to be repaired by repair welding will be described.

When the crack 7 is generated in the pipe 1, the pipe 1 can be repaired by removing a partial region of the pipe 1 including the crack 7 and performing repair welding on the removed portion. However, when the repair welding is performed, a heat-affected zone affected by heat of the repair welding is formed in the pipe 1. In the following, the heat-affected zone 6 generated in the parent material 2 by the influence of heat during welding of the existing welded portion 11 is referred to as a first heat-affected zone 6. Further, the heat-affected zone generated by the influence of heat during welding of a repair welded portion 21 (see FIGS. 9 to 11) is referred to as a second heat-affected zone 26 (see FIGS. 9 to 11).

Figure 6:
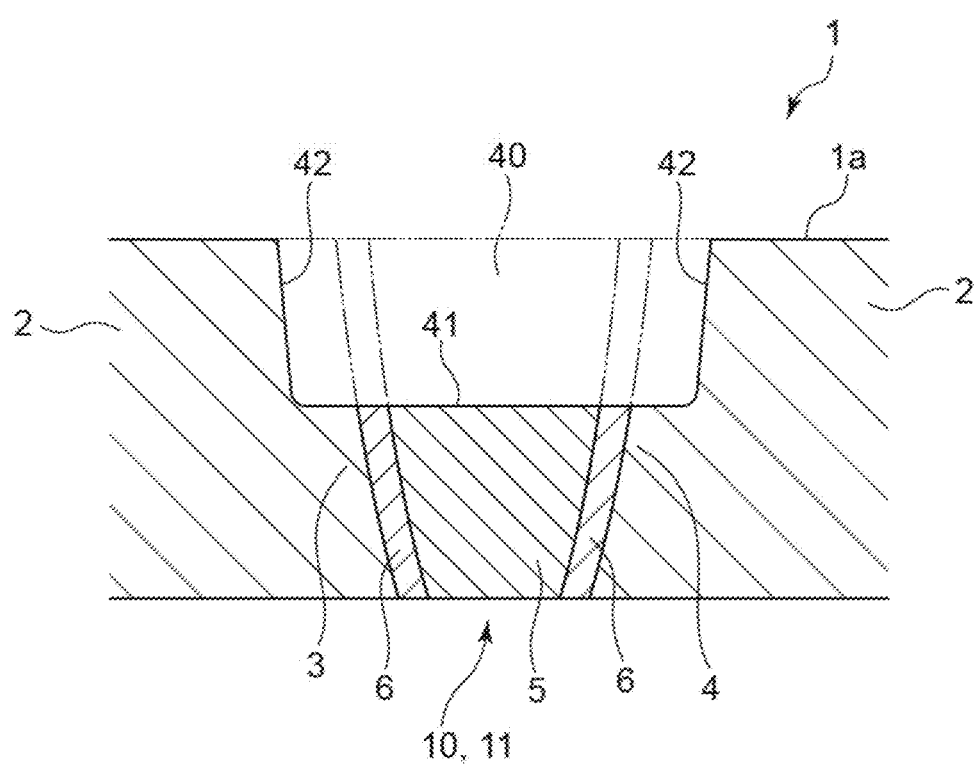
FIG. 6 is a diagram schematically showing a part of a cross-section of the pipe after removing a removal range in the removing step S30.
Figure 7:
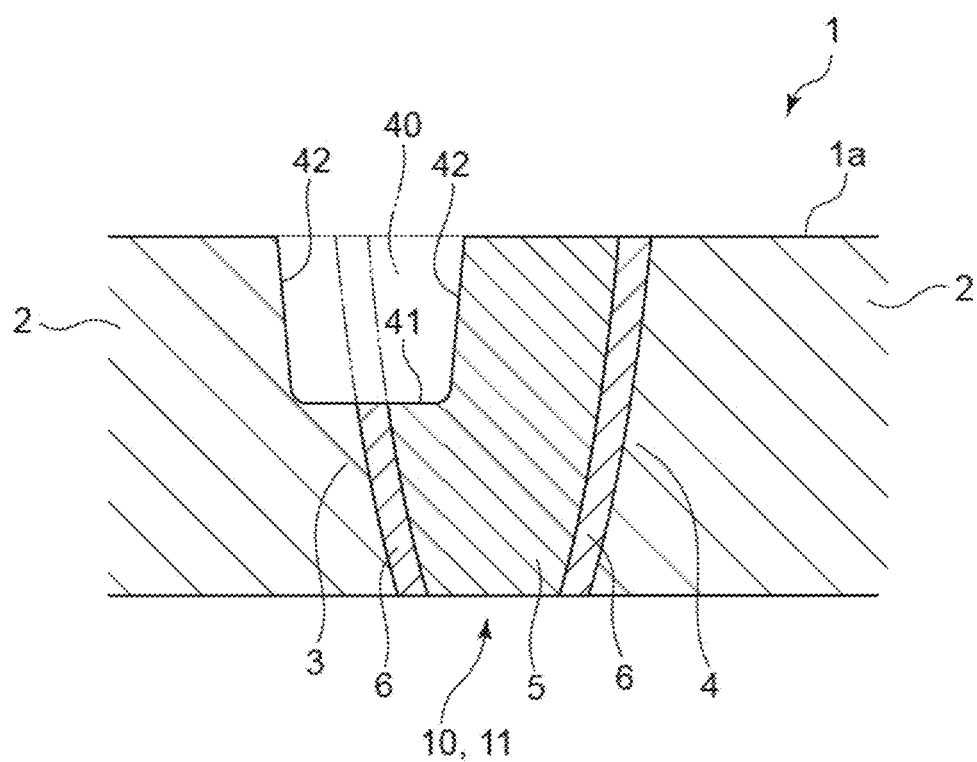
FIG. 7 is a diagram schematically showing a part of a cross-section of the pipe after removing a removal range in the removing step S30.
Figure 8:
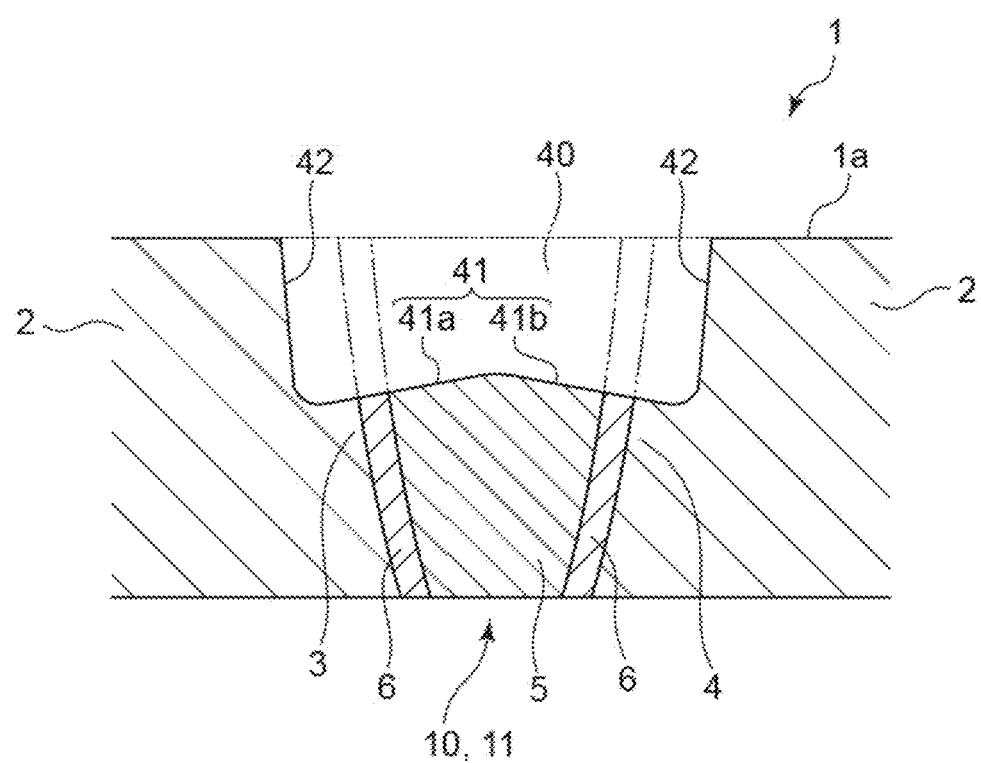
FIG. 8 is a diagram schematically showing a part of a cross-section of the pipe after removing a removal range in the removing step S30.
Figure 9:
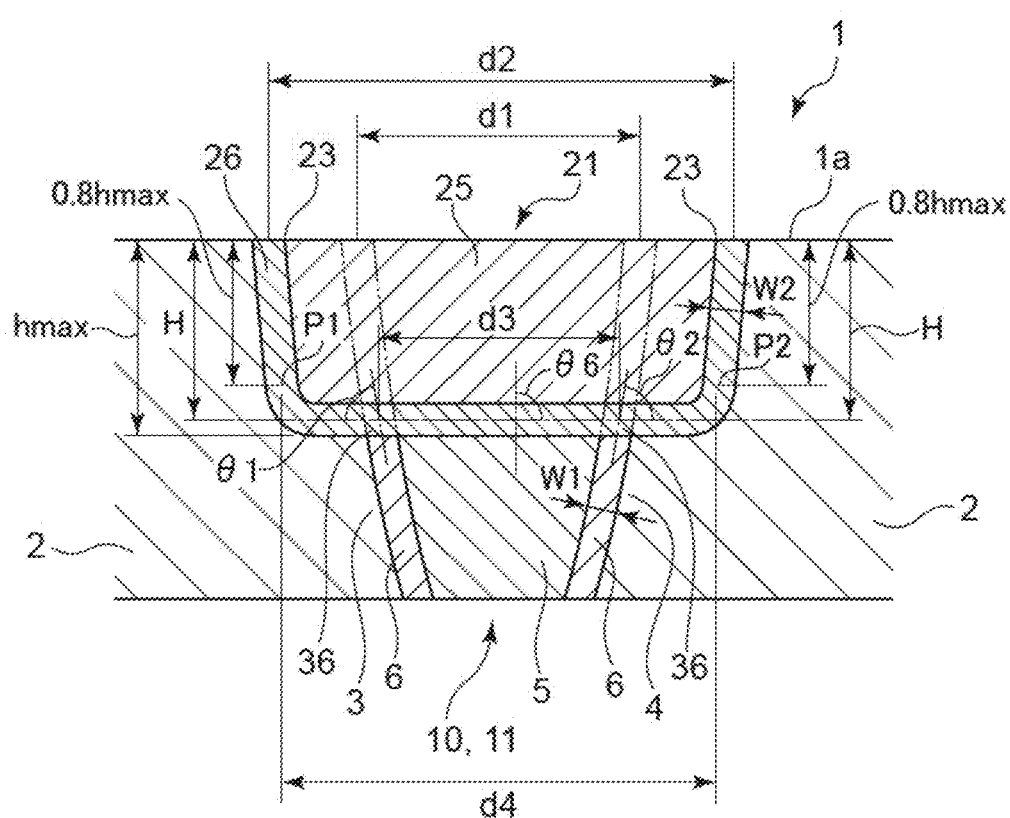
FIG. 9 is a diagram schematically showing a part of a cross-section of the pipe after repair welding.
Figure 10:
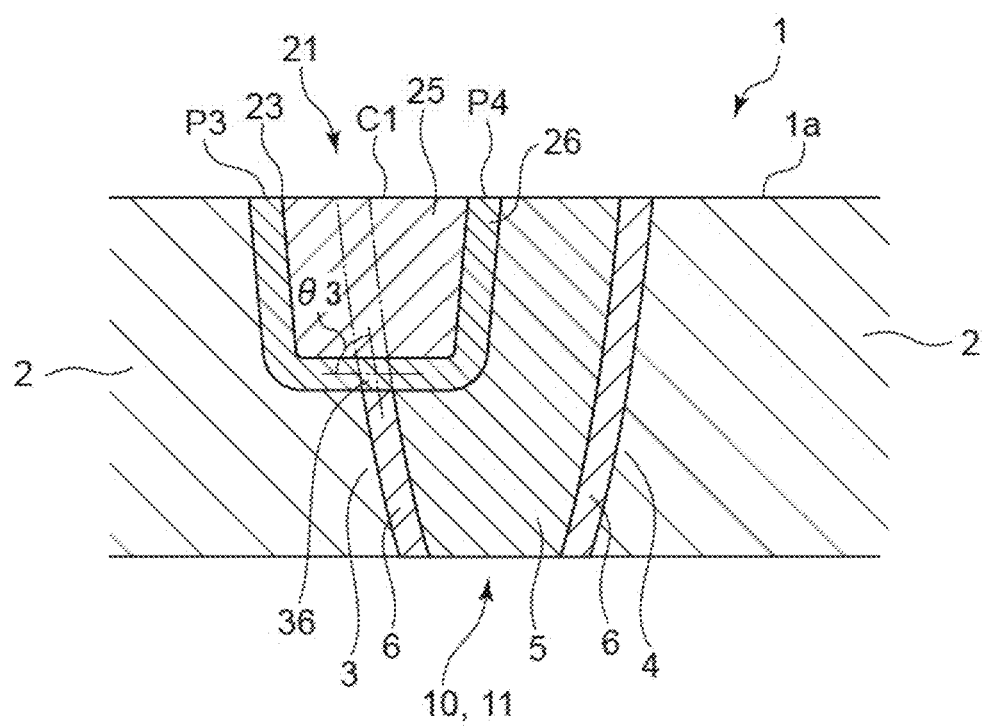
FIG. 10 is a diagram schematically showing a part of a cross-section of the pipe after repair welding.
Figure 11:
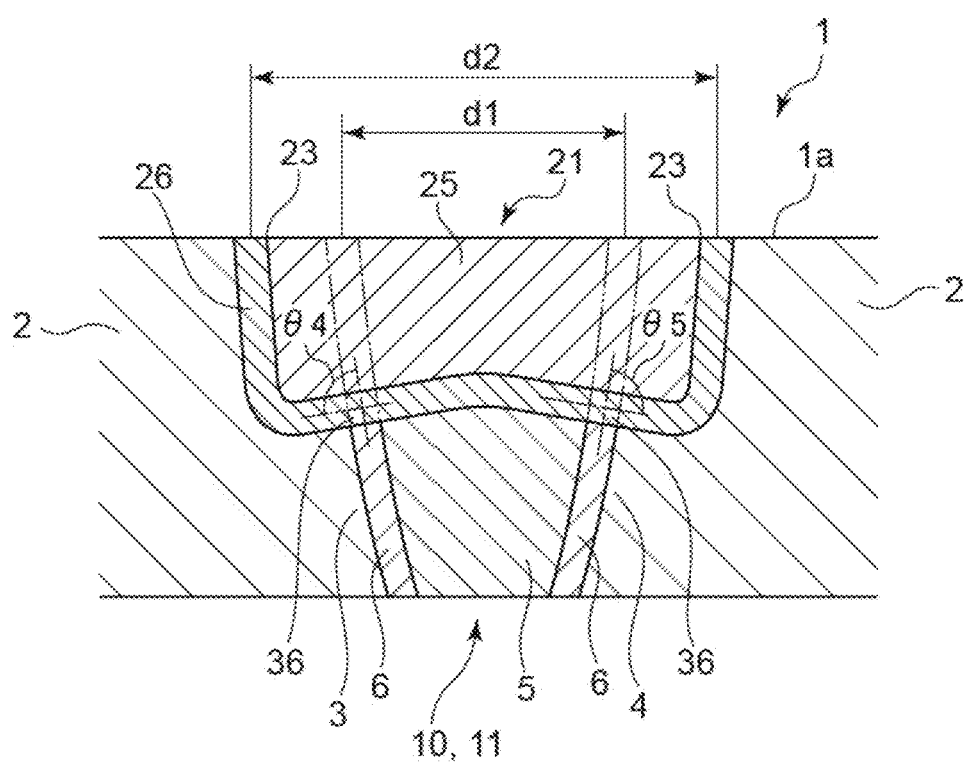
FIG. 11 is a diagram schematically showing a part of a cross-section of the pipe after repair welding.

For example, after removing a part of the pipe 1 including the existing welded portion 11 as shown in FIGS. 6 to 8 described later, when the repair welding is performed as shown in FIGS. 9 to 11 described later, a region where the first heat-affected zone 6 and the second heat-affected zone 26 overlap is formed. In the following, this overlapping region is referred to as an overlapping heat-affected zone 36.

It is revealed that the overlapping heat-affected zone 36 is likely to be damaged due to the acting stress, compared with a region, such as the first heat-affected zone 6 and the second heat-affected zone 26, affected by only heat when the existing welded portion 11 has been obtained or when the repair welding is performed. Therefore, if the overlapping heat-affected zone 36 is formed due to the repair welding, it is desired to reduce the overlapping heat-affected zone 36 as much as possible.

Then, in the repair welding method according to some embodiments, the size of the overlapping heat-affected zone 36 is reduced as much as possible in the following manner. FIG. 3 is a flowchart showing the process of the repair welding method according to some embodiments. The repair welding method according to some embodiments includes a heat-affected zone shape measuring step S10, a removal range determining step S20, a removing step S30, and a repair welding step S40.

The schematic flow of the repair welding method according to some embodiments is as follows. In the repair welding method according to some embodiments, the shape of the first heat-affected zone 6 is measured in the heat-affected zone shape measuring step S10, and a range to be removed from the pipe 1 is determined based on the measurement result in the removal range determining step S20. Then, the removal range determined in the removal range determining step S20 is removed in the removing step S30, and repair welding is performed on the removed portion in the repair welding step S40. Details of each step will now be described.

(Heat-Affected Zone Shape Measuring Step S10)

The heat-affected zone shape measuring step S10 is a step of measuring the shape of the first heat-affected zone 6 prior to the repair welding step S40. In order to reduce the size of the overlapping heat-affected zone 36 as much as possible, it is necessary to consider the setting of the shape of a region to be subjected to the repair welding. To this end, it is necessary to determine the shape of the heat-affected zone 6 of the existing welded portion 11. Therefore, in the repair welding method according to some embodiments, in the heat-affected zone shape measuring step S10, the shape of the heat-affected zone 6 in the vicinity of the crack 7 is measured.

Figure 4A:
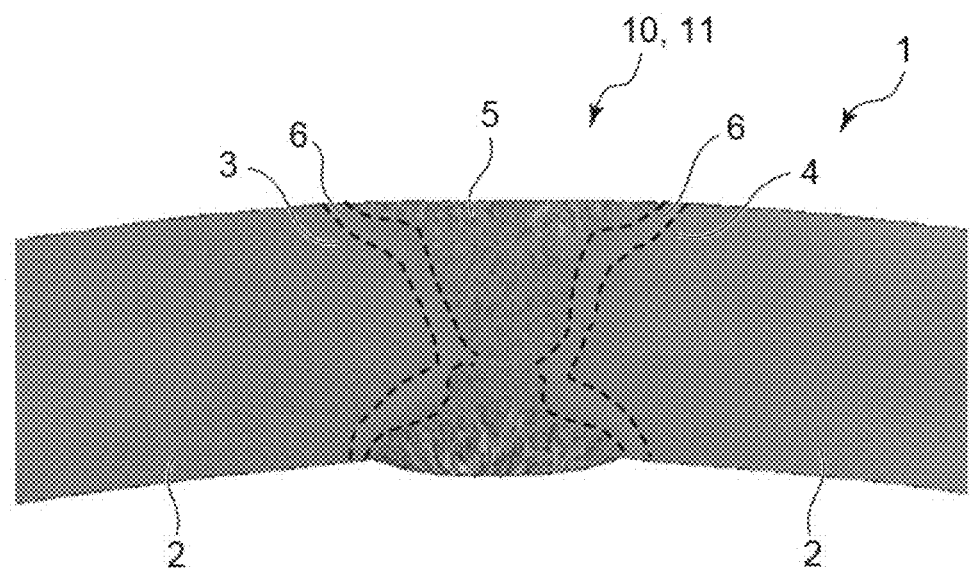
FIGS. 4A and 4B are diagrams showing an example of a part of a cross-section of the pipe including a parent material and an existing welded portion.
Figure 4B:
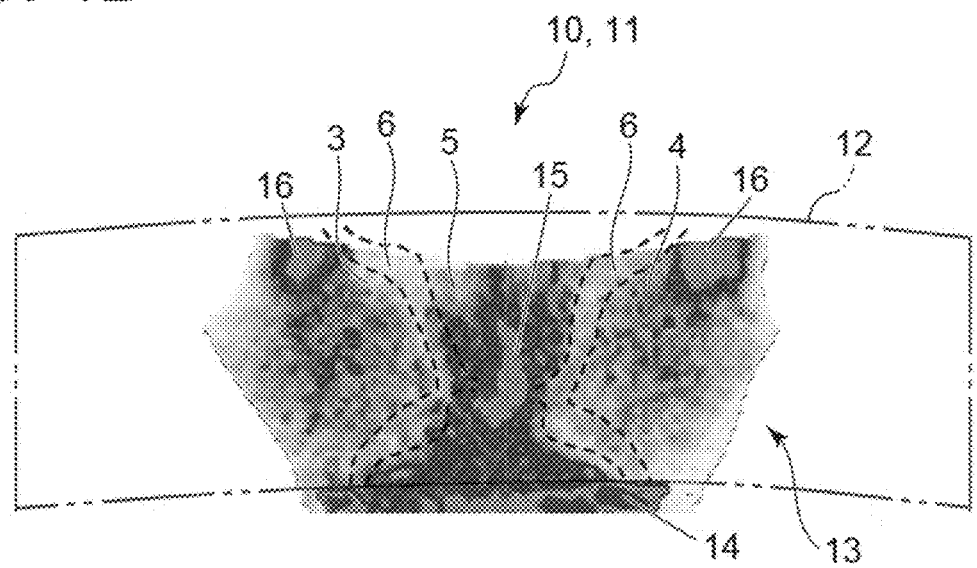

Specifically, in the heat-affected zone shape measuring step S10, the shape of the heat-affected zone 6 in the vicinity of the crack 7 is measured by, for example, ultrasonic flaw detection with the phased array method. FIGS. 4A and 4B are diagrams showing an example of a part of a cross-section of the pipe 1 including the parent material 2 and the existing welded portion 11. FIG. 4A is a diagram showing the macro-structure of the cross-section, and FIG. 4B is a contour diagram showing a result of ultrasonic flaw detection by the phased array method on the cross-section. For convenience of description, in FIGS. 4A and 4B, the boundary between the first heat-affected zone 6 and the parent material 2 or the weld metal 5 is shown by the dotted line. The two-dot chain line 12 in FIG. 4B is an imaginary line representing the shape of the pipe 1.

As is seen from the contour diagram 13 shown in FIG. 4B, the shape of the heat-affected zone 6 can be measured by ultrasonic flaw detection with the phased array method. In the contour diagram 13, back surface echo 14 on the inner peripheral surface of the pipe 1 appears. Further, in the contour diagram 13, noise 15 and wedge noise 16 in the weld metal 5 may also appear. Therefore, it is necessary to identify the shape of the first heat-affected zone 6 in consideration of the appearance of the back surface echo 14 and the noises 15, 16.

In the case of inspecting the presence or absence of damage to the pipe 1 by ultrasonic flaw detection with the phased array method in periodic inspections, information on the shape of the heat-affected zone 6 in the vicinity of the crack 7 may be acquired based on the inspection result obtained by the inspections.

The shape of the heat-affected zone 6 in the vicinity of the crack 7 may be measured by ultrasonic flaw detection with a method other than the phased array method.

Thus, by measuring the shape of the first heat-affected zone 6 by ultrasonic flaw detection with, for example, the phased array method, the shape of the first heat-affected zone 6 can be measured non-destructively.

Figure 5:
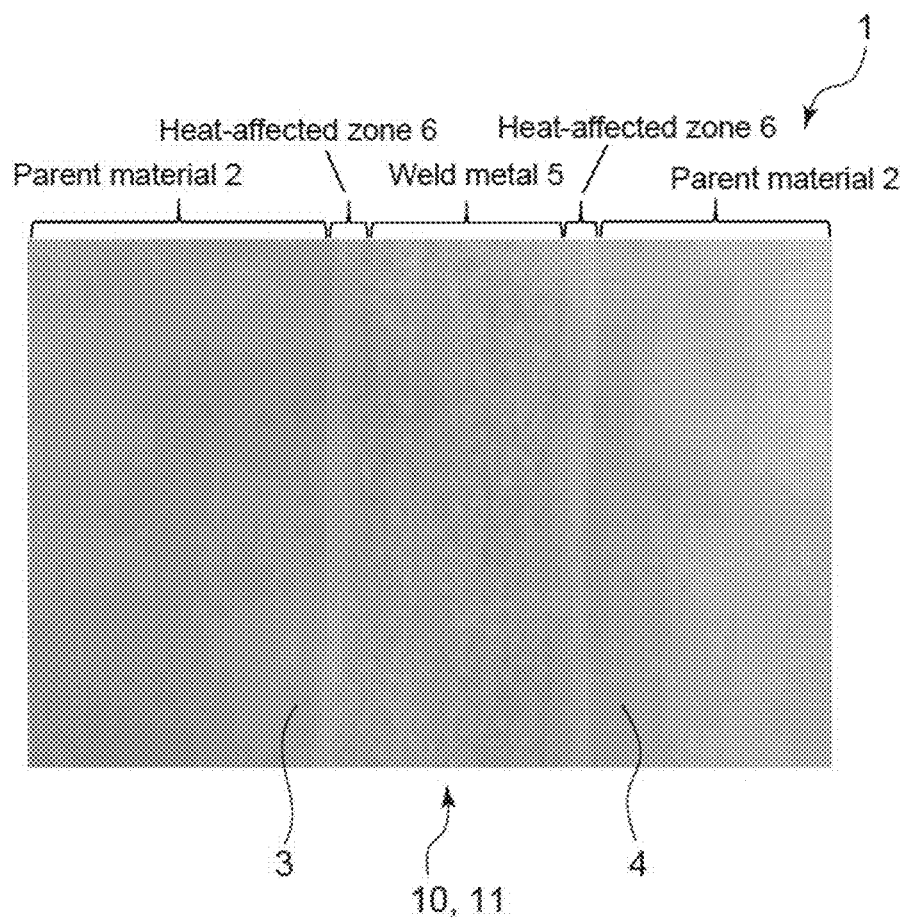
FIG. 5 is a diagram showing an example of the surface of the pipe after micro-etching.

Alternatively, in the heat-affected zone shape measuring step S10, the shape of the first heat-affected zone 6 may be measured by developing the shape of the first heat-affected zone 6 by etching, for example. FIG. 5 is a diagram showing an example of the surface of the pipe 1 after micro-etching. As is seen from FIG. 5, for example by etching, the shape and position of the first heat-affected zone 6 on the outer peripheral surface of the pipe 1 can be measured. The shape of the first heat-affected zone 6 inside the pipe 1 can be estimated based on design information regarding the existing welded portion 11 such as the groove shape.

By making the shape of the first heat-affected zone 6 appear on the surface of the pipe 1 by a simple method of etching, the shape of the first heat-affected zone 6 can be easily measured.

When the intersection angle between the first heat-affected zone 6 and the second heat-affected zone 26 can be set to a desired angle as described later without measuring the shape of the first heat-affected zone 6, the heat-affected zone shape measuring step S10 does not necessarily have to be performed.

(Removal Range Determining Step S20)

The removal range determining step S20 is a step of determining the removal range to be removed in the removing step S30, based on the shape of the first heat-affected zone 6 measured in the heat-affected zone shape measuring step S10.

For instance, as shown in FIG. 9, in a cross-section of the pipe 1 including the parent material 2 and the existing welded portion 11, the first heat-affected zone 6 is formed, along an interface with the weld metal 5, with a constant width W1 from the interface to the parent material 2. Similarly, in a cross-section of the pipe 1 including the parent material 2 and the existing welded portion 11, the second heat-affected zone 26 is formed, along an interface with the weld metal 25 of the repair welding, with a constant width W2. Accordingly, in a cross-section of the pipe 1 including the parent material 2 and the existing welded portion 11, when the intersection angles $\theta 1$ to $\theta 5$ between the first heat-affected zone 6 and the second heat-affected zone 26 are 90°, the cross-sectional area of the intersection portion between the first heat-affected zone 6 and the second heat-affected zone 26, that is, the overlapping heat-affected zone 36 can be minimized. Conversely, as the intersection angles $\theta 1$ to $\theta 5$ between the first heat-affected zone 6 and the second heat-affected zone 26 deviate from 90°, the cross-sectional area of the overlapping heat-affected zone 36 increases.

Therefore, in the removal range determining step S20 according to some embodiments, the removal range to be removed in the removing step S30 is determined such that the intersection angles $\theta 1$ to $\theta 5$ between the first heat-affected zone 6 and the second heat-affected zone 26 range from 70° to 110° and the crack 7 is removed.

Specifically, in the removal range determining step S20 according to some embodiments, the removal range of the removing step S30 is determined such that the intersection angles between the first heat-affected zone 6 and the second heat-affected zone 26 range from 70° to 110°, considering that the second heat-affected zone 26 is formed with a constant width W2 inside the member constituting the pipe 1 from a surface appearing after removing a part of the pipe 1 in the removing step S30.

For example, in the removal range determining step S20 according to an embodiment, as shown in FIG. 6, not only a part of the heat-affected zone 6 on the first end 3 side with the crack 7, but also a part of the heat-affected zone 6 on the second end 4 side without the crack 7 is determined as the removal range 40. FIG. 6 is a diagram schematically showing a part of a cross-section including the parent material 2 and the existing welded portion 11 of the pipe 1 after removing the removal range 40 in the removing step S30.

In the embodiment shown in FIG. 6, the bottom surface of the removal range 40, i.e., the surface 41 extending in the circumferential direction (right-left direction in figure) of the surface appearing after removing the removal range 40 may be plane as schematically shown in FIG. 6, or may be curved about the axis of the pipe 1 such that the depth of the removal range 40 increases toward the circumferentially central side as compared with the plane case, although it is not illustrated.

Further, in the embodiment shown in FIG. 6, the side surfaces of the removal range 40, i.e., the surface 42 on the first end 3 side and the surface 42 on the second end 4 side extending in the thickness direction of the parent material 2 (upper-lower direction in figure) of the surface appearing after removing the removal range 40 may extend from the outer peripheral surface 1a of the pipe 1 in substantially the same direction as the thickness direction of the parent material 2, and the extending directions may be set such that the removal range 40 becomes narrower toward the radially inner side of the pipe 1, as schematically shown in FIG. 6.

When the extending directions of the surface 42 on the first end 3 side and the surface 42 on the second end 4 side are close to the thickness direction of the parent material 2 (radial direction of pipe 1), the removal range 40 can be narrowed, that is, the range for the repair welding can be narrowed, and the production cost required for the removal and the repair welding can be reduced.

For example, in the removal range determining step S20 according to another embodiment, as shown in FIG. 7, a part of the heat-affected zone 6 on the first end 3 side with the crack 7 is determined as the removal range 40. FIG. 7 is a diagram schematically showing a part of a cross-section including the parent material 2 and the existing welded portion 11 of the pipe 1 after removing the removal range 40 in the removing step S30.

In the embodiment shown in FIG. 7, the surface 41 may be plane as schematically shown in FIG. 7, as with the embodiment shown in FIG. 6, or may be curved about the axis of the pipe 1 although not illustrated.

Further, in the embodiment shown in FIG. 7, the surface 42 on the first end 3 side and the surface 42 formed on the weld metal 5 may extend from the outer peripheral surface 1a of the pipe 1 in substantially the same direction as the thickness direction of the parent material 2, and the extending directions may be set such that the removal range 40 becomes narrower toward the radially inner side of the pipe 1, as schematically shown in FIG. 7, as with the embodiment shown in FIG. 6.

For example, in the removal range determining step S20 according to still another embodiment, as shown in FIG. 8, not only a part of the heat-affected zone 6 on the first end 3 side with the crack 7, but also a part of the heat-affected zone 6 on the second end 4 side without the crack 7 is determined as the removal range 40. FIG. 8 is a diagram schematically showing a part of a cross-section including the parent material 2 and the existing welded portion 11 of the pipe 1 after removing the removal range 40 in the removing step S30.

In the embodiment shown in FIG. 8, the surface 41 includes a first surface 41 inclined so as to be close to a direction perpendicular to the extending direction of the heat-affected zone 6 on the first end 3 side, and a second surface 41b inclined so as to be close to a direction perpendicular to the extending direction of the heat-affected zone 6 on the second end 4 side. In other words, in the embodiment shown in FIG. 8, the extending direction of the first surface 41a and the extending direction of the second surface 41b are individually set in accordance with the heat-affected zone 6 on the first end 3 side and the heat-affected zone 6 on the second end 4 side with having slightly different extending directions.

Further, in the embodiment shown in FIG. 8, the surface 42 on the first end 3 side and the surface 42 on the second end 4 side may extend from the outer peripheral surface 1a of the pipe 1 in substantially the same direction as the thickness direction of the parent material 2, and the extending directions may be set such that the removal range 40 becomes narrower toward the radially inner side of the pipe 1, as schematically shown in FIG. 8, as with the embodiment shown in FIG. 6.

Thus, since the repair welding method according to some embodiments includes the heat-affected zone shape measuring step S10 and the removal range determining step S20, the removal range 40 can be set such that the inclination angle between the first heat-affected zone 6 and the second heat-affected zone 26 is 70° to 110° and removed. As a result, it is possible to suppress the increase in cross-sectional area of the overlapping heat-affected zone 36 in a cross-section including the parent material 2 and the existing welded portion 11, and it is possible to suppress the reduction in lifetime of the pipe 1 due to the repair welding.

(Removing Step S30)

The removing step S30 is a step of removing a portion including at least a part of the first heat-affected zone 6 of the existing welded portion 11.

In the removing step S30, the removal range 40 determined in the removal range determining step S20 is removed with a grinding tool such as a grinder. The pipe 1 after removing the removal range 40 in the removing step S30 has a cross-sectional shape as shown in FIGS. 6 to 8 as described above.

(Repair Welding Step S40)

The repair welding step S40 is a step of performing repair welding after removing the removal range 40.

In the repair welding step S40 according to an embodiment, the repair welding is performed as shown in FIG. 9. FIG. 9 is a diagram schematically showing a part of a cross-section of the pipe 1 including the parent material 2 and the existing welded portion 11 and shows the case where the repair welding is performed after removing the removal range 40 shown in FIG. 6 in the removing step S30 according to an embodiment.

In the repair welding step S40 according to another embodiment, the repair welding is performed as shown in FIG. 10. FIG. 10 is a diagram schematically showing a part of a cross-section of the pipe 1 including the parent material 2 and the existing welded portion 11 and shows the case where the repair welding is performed after removing the removal range 40 shown in FIG. 7 in the removing step S30 according to another embodiment.

In the repair welding step S40 according to still another embodiment, the repair welding is performed as shown in FIG. 11. FIG. 11 is a diagram schematically showing a part of a cross-section of the pipe 1 including the parent material 2 and the existing welded portion 11 and shows the case where the repair welding is performed after removing the removal range 40 shown in FIG. 8 in the removing step S30 according to still another embodiment.

For convenience of description, in FIGS. 9 to 11, the position where the first heat-affected zone 6 of the existing welded portion 11 was present is represented by the two-dot chain line.

The pipe 1 after the repair welding in the repair welding step S40 according to some embodiments has the following features. In other words, the removal range 40 is determined in the removal range determining step S20 such that the pipe 1 after the repair welding has the following features.

In some embodiments shown in FIGS. 9 to 11, in a cross-section including the parent material 2 and the existing welded portion 11, all intersection portions (overlapping heat-affected zones 36) between the first heat-affected zone 6 of the existing welded portion 11 and the second heat-affected zone 26 due to the repair welding have an intersection angle between the first heat-affected zone 6 and the second heat-affected zone 26 of 70° to 110°.

In a cross-section including the parent material 2 and the existing welded portion 11, the intersection portion (overlapping heat-affected zone 36) between the first heat-affected zone 6 of the existing welded portion 11 and the second heat-affected zone 26 of the repair welded portion 21 is likely to be damaged due to the acting stress as described above, so that it is desired to reduce the overlapping heat-affected zone 36 as much as possible.

Further, as described above, in a cross-section including the parent material 2 and the existing welded portion 11, since the first heat-affected zone 6 and the second heat-affected zone 26 are formed with constant widths W1, W1 along the interfaces with the weld metals 5, 25, respectively, when the intersection angles θ1 to θ5 between the first heat-affected zone 6 and the second heat-affected zone 26 are 90°, the cross-sectional area of the overlapping heat-affected zone 36 can be minimized, and as the intersection angles θ1 to θ5 are deviated from 90°, the cross-sectional area of the overlapping heat-affected zone 36 increases.

In this regard, in some embodiments shown in FIGS. 9 to 11, since the intersection angles θ1 to θ5 between the first heat-affected zone 6 and the second heat-affected zone 26 range from 70° to 110°, in a cross-section including the parent material 2 and the existing welded portion 11, it is possible to suppress the increase in cross-sectional area of the overlapping heat-affected zone 36. As a result, it is possible to suppress the reduction in lifetime of the pipe 1 due to the repair welding.

In the embodiments shown in FIGS. 9 and 11, in a cross-section including the parent material 2 and the existing welded portion 11, the repair welding is performed from the parent material 2 on the first end 3 side to the parent material 2 on the second end 4 side.

Further, a second distance d2 is 1.1 to 2.0 times a first distance d1, where the first distance d2 is a distance on the surface of the parent material 2 between the first heat-affected zone 6 formed in the parent material 2 on the first end 3 side and the first heat-affected zone 6 formed in the parent material 2 on the second end 4 side before removing the removal range 40, and the second distance d2 is a distance on the surface of the parent material 2 between the second heat-affected zone 26 formed in the parent material 2 on the first end 3 side and the second heat-affected zone 26 formed in the parent material 2 on the second end 4 side.

When the second distance d2 is 1.1 times or more the first distance d1, it is possible to suppress the overlapping of the first heat-affected zone 6 and the second heat-affected zone 26 in the vicinity of the surface of the parent material 2.

Further, when the second distance d2 is 2.0 times or less the first distance d1, it is possible to suppress the range of the repair welding.

In the embodiment shown in FIG. 9, in a cross-section including the parent material 2 and the existing welded portion 11, the repair welding is performed from the parent material 2 on the first end 3 side to the parent material 2 on the second end 4 side.

Further, a third distance d3 is not greater than a fourth distance d4, where the third distance d3 is a distance between the overlapping heat-affected zone 36 on the first end 3 side and the overlapping heat-affected zone 36 on the second end 4 side, and the fourth distance d4 is a distance between a position P1 of the second heat-affected zone 26 on the first end 3 side at a depth 0.8 times the maximum value hmax of the depth h from the surface of the weld metal 25 to the second heat-affected zone 26 and a position P2 on the second end 4 side at a depth 0.8 times the maximum value hmax.

Thus, the depths H of the overlapping heat-affected zone 36 on the first end 3 side and the overlapping heat-affected zone 36 on the second end 4 side can be set to 0.8 times or more the maximum value hmax of the depth h from the surface of the weld metal of the repair welding to the second heat-affected zone 26. Thus, in a cross-section including the parent material 2 and the existing welded portion 11, the positions in the depth direction of the overlapping heat-affected zone 36 on the first end 3 side and the overlapping heat-affected zone 36 on the second end 4 side can be brought closer to the deepest position in the second heat-affected zone 26. Accordingly, the extending directions of the overlapping heat-affected zone 36 on the first end 3 side and the overlapping heat-affected zone 36 on the second end 4 side can be brought closer to a direction perpendicular to the depth direction. Therefore, when the first heat-affected zone 6 in the overlapping heat-affected zone 36 extends in substantially the same direction as the depth direction, the intersection angles θ1, θ2 at the overlapping heat-affected zones 36 can be brought closer to 90°, so that it is possible to suppress the increase in cross-sectional area of the overlapping heat-affected zone 36.

In the embodiment shown in FIG. 9, in a cross-section including the parent material 2 and the existing welded portion 11, the intersection angle θ6 between the extending direction of the second heat-affected zone 26 formed in the weld metal 5 of the existing welded portion 11 due to the repair welding and the thickness direction of the pipe 1 is 70° to 110°.

The second heat-affected zone 26 at the weld metal 5 of the existing welded portion 11 is more likely to be damaged due to the acting stress, than the weld metal 5 of the existing welded portion 11 not affected by heat of the repair welding or the second heat-affected zone 26 of the parent material 2. Accordingly, if tensile stress acts on the pipe 1 in the circumferential direction, i.e., in the direction in which the first end 3 and the second end 4 are away from each other, it is desired that the projection area of the second heat-affected zone 26 at the weld metal 5 of the existing welded portion 11 when viewed from the acting direction of the tensile stress is as small as possible.

In this regard, in the embodiment shown in FIG. 9, since the intersection angle θ6 between the extending direction of the second heat-affected zone 26 at the weld metal 5 of the existing welded portion 11 and the thickness direction of the pipe 1 is 70° to 110°, the extending direction of the second heat-affected zone 26 at the weld metal 5 of the existing welded portion 11 is close to the direction in which the tensile stress acts, so that it is possible to reduce the projection area.

In the embodiments shown in FIGS. 9 and 11, the weld toe 23 of the repair welding is at the parent material 2. In the embodiment shown in FIG. 10, the weld toe 23 of the repair welding on the first end 3 side is at the parent material 2.

Thus, compared with the case where the weld toe 23 of the repair welding is at the weld metal 5 of the existing welded portion 11, it is possible to reduce a region of the second heat-affected zone 26 at the weld metal 5.

In the embodiment shown in FIG. 10, in a cross-section including the parent material 2 and the existing welded portion 11, the repair welding is performed from the parent material 2 on the first end 3 side to the weld metal 5 of the existing welded portion 11.

Further, an intermediate position C1 between the position P3 of the second heat-affected zone 26 appearing on the surface of the parent material 2 on the first end 3 side and the position P4 of the second heat-affected zone 26 appearing on the surface of the weld metal 5 of the existing welded portion 11 is at the weld metal 5 of the existing welded portion 11 before removing the removal range 40.

Thus, while suppressing the increase in cross-sectional area of the overlapping heat-affected zone 36, the removal amount in the removing step S30 and the volume of the weld metal 25 by the repair welding can be reduced, and the production cost for the repair welding can be reduced.

In the embodiment shown in FIG. 11, in a cross-section including the parent material 2 and the existing welded portion 11, the repair welding is performed from the parent material 2 on the first end 3 side to the parent material 2 on the second end 4 side. Further, in the embodiment shown in FIG. 11, the first heat-affected zone 6 on the first end 3 side is inclined with respect to the radial direction of the pipe 1, at least in the intersection portion (overlapping heat-affected zone 36) with the second heat-affected zone 26, so as to approach the second end 4 as the distance from the outer peripheral surface 1a of the pipe 1 increases. In the embodiment shown in FIG. 11, the first heat-affected zone 6 on the second end 4 side is inclined with respect to the radial direction of the pipe 1, at least in the intersection portion (overlapping heat-affected zone 36) with the second heat-affected zone 26, so as to approach the first end 3 as the distance from the outer peripheral surface 1a of the pipe 1 increases.

Further, in the embodiment shown in FIG. 11, the second heat-affected zone 26 is formed such that, at least in the intersection portion (overlapping heat-affected zone 36) with the first heat-affected zone 6 on the first end 3 side, the depth from the outer peripheral surface 1a of the pipe 1 decreases from the first end 3 side to the second end 4 side. Further, in the embodiment shown in FIG. 11, the second heat-affected zone 26 is formed such that, at least in the intersection portion (overlapping heat-affected zone 36) with the first heat-affected zone 6 on the second end 4 side, the depth from the outer peripheral surface 1a of the pipe 1 decreases from the second end 4 side to the first end 3 side.

As a result, the intersection angles $\theta 4$, $\theta 5$ at the overlapping heat-affected zones 36 can be brought closer to 90°, so that it is possible to suppress the increase in cross-sectional area of the overlapping heat-affected zone 36.

The repair welding method according to the above-described embodiments is suitable for repair welding of the pipe 1 having the longitudinal weld 10 of the pipe 1.

The repair welding method according to the above-described embodiments is suitable for repair welding of high-temperature pipes of boilers and turbines in thermal power and nuclear power plants, chemical plants, for example. Such high-temperature pipes are important pipes that are used for a long time in a high-temperature environment, so if breakage occurs, it is expected to have a significant effect on the operation of the plant. Further, such high-temperature pipes are required to be usable for a long time since plant inspections and repairs are generally performed at a limited time such as periodic inspections. Further, such high-temperature pipes may take a long time to obtain from the viewpoint of material, thickness, and the like. Therefore, for example, if the crack 7 of the pipe 1 can be repaired by the repair welding method according to the above-described embodiments within a limited period such as periodic inspections, the great economic effect can be achieved.

In the above description, the material of the pipe 1 is not particularly mentioned, but the repair welding method according to some embodiments is suitable for repair welding of a member made of high-strength ferritic heat-resistant steel in which a decrease in strength at the overlapping heat-affected zone 36 tends to be a problem.

The high-strength ferritic heat-resistant steel may be, for example, an equivalent material to grade 91 steel (KA-SCMV28, KA-STPA28, KA-SFVAF28, KA-STBA28), an equivalent material to grade 92 steel (KA-STPA29, KA-SFVAF29, KA-STBA29), an equivalent material to KA grade 122 steel (KA-SUS410J3, KA-SUS410J3TP, KA-SUSF410J3, KA-SUS410J3 TB, KA-SUS410J3DTB), or an equivalent material to grade 23 steel (KA-STPA24J1, KA-SFVAF22AJ1, KA-STBA24J1, KA-SCMV4J1).

The material of the pipe 1 is not limited to the high-strength ferritic steel, but may be low alloy steel or stainless steel. The low alloy steel may be, for example, an equivalent material to STBA12, an equivalent material to STBA13, an equivalent material to STPA20, an equivalent material to KA-STPA21, an equivalent material to STPA22, an equivalent material to STPA23, or an equivalent material to STPA24. The stainless steel may be, for example, an equivalent material to SUS304TP, an equivalent material to SUS304LTP, an equivalent material to SUS304HTP, an equivalent material to KA-SUS304J1HTB, an equivalent material to SUS321TP, an equivalent material to SUS321HTP, an equivalent material to SUS316HTP, an equivalent material to SUS347HTP, or an equivalent material to KA-SUS310J1 TB.

The present invention is not limited to the embodiments described above, but includes modifications to the embodiments described above, and embodiments composed of combinations of those embodiments.

For example, in the above-described embodiments, the repair method for the longitudinal weld 10 of the pipe 1 has been described as an example, but the present invention is not limited thereto. The repair welding method according to the above-described embodiments may be applied to repair welding of other welds such as a circumferential weld connecting pipes or a header tube weld connecting header and branch pipes. Further, the repair welding method according to the above-described embodiments may be applied to repair welding of welds of members other than pipes such as plates.

REFERENCE SIGNS LIST

1 High-temperature pipe (Pipe)
2 Parent material
3 First end
4 Second end 5, 25 Weld metal
6 (Heat-affected zone) First heat-affected zone
7 Crack
10 Longitudinal weld
11 Existing welded portion
21 Repair welded portion
23 Weld toe
26 Heat-affected zone (Second heat-affected zone)
36 Intersection portion (Overlapping heat-affected zone)

The invention claimed is:

1. A repair welding method for a member in which a first end and a second end of a parent material are connected by welding, comprising:
    a step of removing a portion including at least a part of a first heat-affected zone of an existing welded portion of the member; and
    a step of performing repair welding after removing the portion,
    wherein, in a cross-section including the parent material and the existing welded portion, all intersection portions between the first heat-affected zone of the existing welded portion and a second heat-affected zone due to the repair welding have an intersection angle between the first heat-affected zone and the second heat-affected zone of 70° to 110°,
    wherein, in a cross-section including the parent material and the existing welded portion, the repair welding is performed from the parent material on a first end side to a weld metal of the existing welded portion, and
    wherein an intermediate position between a position of the second heat-affected zone appearing on a surface of the parent material on the first end side and a position of the second heat-affected zone appearing on a surface of the weld metal of the existing welded portion is at the weld metal of the existing welded portion before removing the portion including at least a part of the first heat-affected zone.

2. The repair welding method according to claim 1, wherein, in a cross-section including the parent material and the existing welded portion, an intersection angle between an extending direction of the second heat-affected zone formed in a weld metal of the existing welded portion due to the repair welding and a thickness direction of the member is 70° to 110°.

3. The repair welding method according to claim 1, wherein a weld toe of the repair welding on the first end side is at the parent material.

4. The repair welding method according to claim 1, further comprising:
    a step of measuring a shape of the first heat-affected zone prior to the step of performing the repair welding; and
    a step of determining a removal range to be removed in the step of removing the portion including at least a part of the first heat-affected zone, based on the shape of the first heat-affected zone measured in the step of measuring the shape of the first heat-affected zone.

5. The repair welding method according to claim 4, wherein the step of measuring the shape of the first heat-affected zone includes measuring the shape of the first heat-affected zone by ultrasonic flaw detection with a phased array method, or measuring the shape of the first heat-affected zone by developing the shape of the first heat-affected zone by etching.

6. The repair welding method according to claim 1, wherein the parent material is high-strength ferritic heat-resistant steel.

7. The repair welding method according to claim 1, wherein the member is a boiler tube.

* * * * *